(12) United States Patent
Ishikawa et al.

(10) Patent No.: US 7,087,874 B2
(45) Date of Patent: Aug. 8, 2006

(54) APPARATUS FOR DRYING CERAMIC MOLDED ARTICLES USING MICROWAVE ENERGY

(75) Inventors: Satoshi Ishikawa, Anjo (JP); Hiromi Katou, Kuwana (JP); Shoichi Goto, Nagoya (JP); Tomio Minobe, Fujimi (JP)

(73) Assignees: Denso Corporation (JP); Micro Denshi Co., Ltd. (JP)

( * ) Notice: Subject to any disclaimer, the term of this patent is extended or adjusted under 35 U.S.C. 154(b) by 226 days.

(21) Appl. No.: 10/705,883

(22) Filed: Nov. 13, 2003

(65) Prior Publication Data

US 2004/0104514 A1 Jun. 3, 2004

(30) Foreign Application Priority Data

Nov. 19, 2002 (JP) .............................. 2002-335551

(51) Int. Cl.
H05B 6/68 (2006.01)
H05B 6/78 (2006.01)

(52) U.S. Cl. ...................... 219/701; 219/702; 219/704; 219/762; 34/259; 425/174.4

(58) Field of Classification Search ........ 219/698–702, 219/704–705, 762, 518; 34/259, 264; 264/489–490; 425/174–174.4

See application file for complete search history.

(56) References Cited

U.S. PATENT DOCUMENTS 3,151,230 A * 9/1964 Britton ........................ 219/699
3,704,523 A * 12/1972 Guerga et al. ................ 34/264
4,956,530 A * 9/1990 Koch ........................... 219/701
5,408,074 A * 4/1995 Warmbier et al. ........... 219/701
6,157,014 A * 12/2000 Goranson .................... 219/700
2003/0057205 A1* 3/2003 Minobe et al. .............. 219/700

FOREIGN PATENT DOCUMENTS

| DE | 1440523 | 11/1968 |
| DE | 3830867 | 1/1990 |
| DE | 4136416 | 5/1993 |
| DE | 10201300 | 8/2002 |
| GB | 851109 | 10/1960 |
| JP | 2000-44326 | 2/2000 |

OTHER PUBLICATIONS

German Official Action dated Feb. 2, 2006 issued in corresponding German Appln. No. 103 53 784.8-45 with English translation.

* cited by examiner

Primary Examiner—Philip H. Leung
(74) Attorney, Agent, or Firm—Nixon & Vanderhye PC

(57) ABSTRACT

An apparatus and a method, for drying ceramic molded articles, are disclosed. A drying apparatus (1) comprises a drying chamber (10) for accommodating ceramic molded articles (8), a plurality of microwave generators (20) for supplying microwave energy into the drying chamber, and a conveyor (30) for charging the ceramic molded articles (8) continuously into the drying chamber (10), conveying the ceramic molded articles through the drying chamber, and delivering the ceramic molded articles from the drying chamber. The drying chamber (10) has arranged therein a plurality of the microwave generators (20) and at least a sensor (40) for detecting the distribution of the ceramic molded articles (8) in the drying chamber (10). Each microwave generator (20) is adapted to change the output thereof in accordance with the distribution of the ceramic molded articles (8) detected by the sensor (40).

6 Claims, 11 Drawing Sheets

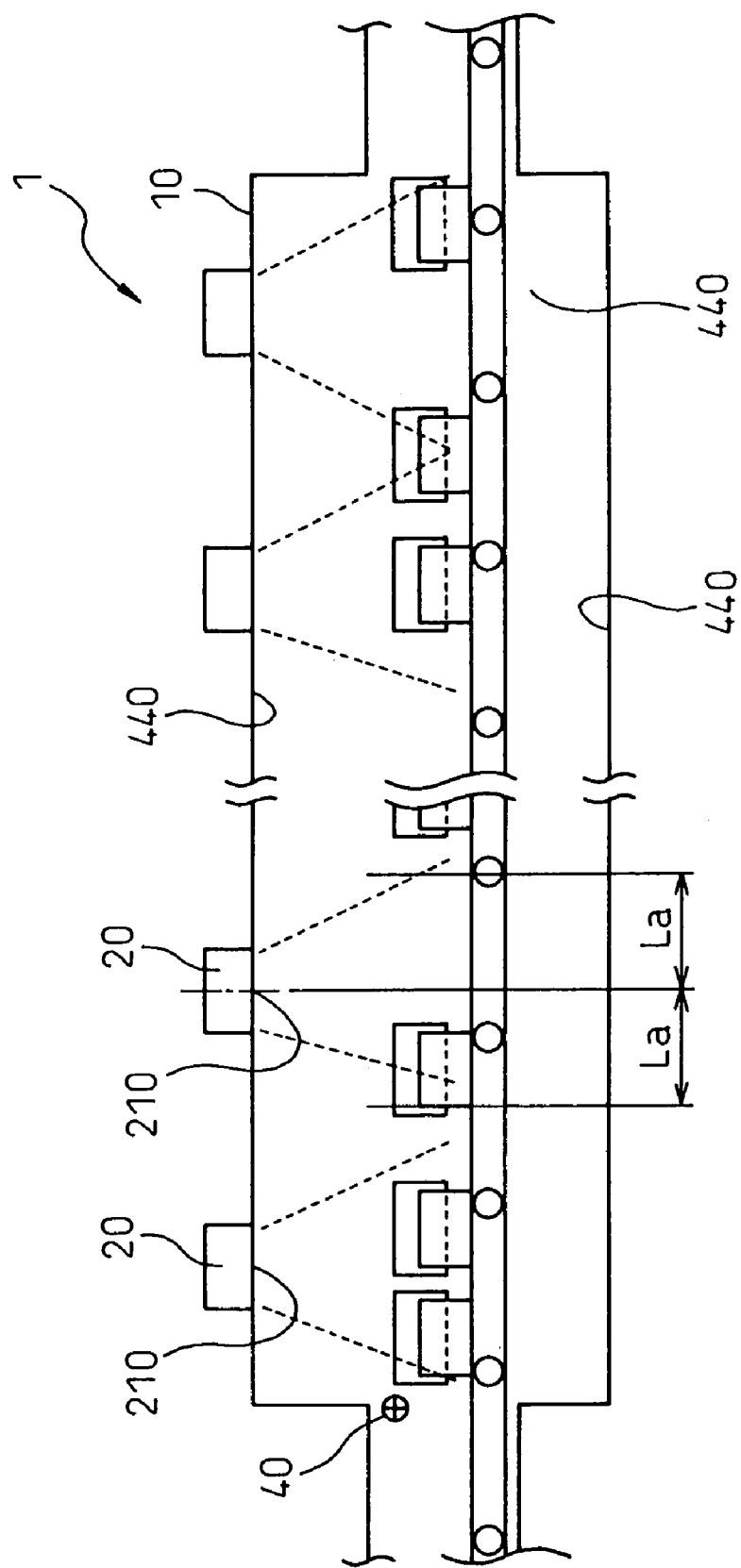

APPARATUS FOR DRYING CERAMIC MOLDED ARTICLES USING MICROWAVE ENERGY

BACKGROUND OF THE INVENTION

1. Field of the Invention

The present invention relates to a method and an apparatus for drying ceramic articles molded by extrusion.

2. Description of the Related Art

In fabricating ceramic molded articles, a clay-like ceramic material is extruded, dried and baked.

A conventional apparatus for drying ceramic molded articles is disclosed, for example, in JPP (Japanese Unexamined Patent Publication) 2000-44326, in which a part of the path for conveying extruded ceramic molded articles is covered by a drying chamber, and the ceramic molded articles being conveyed through the drying chamber are dried by being irradiated with microwave energy.

In this conventional drying apparatus, the microwave energy is required to be slowly and uniformly radiated in order to dry the ceramic molded articles uniformly without any strain. For this purpose, it is common practice to carry out the drying process in which a plurality of ceramic molded articles are continuously charged and conveyed in a drying bath longitudinally along the direction of conveyance to radiate microwave energy, with low energy density, over a long time.

This conventional drying apparatus poses the problem described below. Specifically, in the case where the ceramic molded articles are arranged at irregular intervals in the drying chamber of the drying apparatus, the amount of microwave energy absorbed into the ceramic molded articles lacks uniformity.

Especially in the case where the train of ceramic molded articles in the drying chamber is temporarily disconnected, the neighboring ceramic molded articles may be overdried by absorbing an increased amount of microwave energy. In the conventional drying apparatus, therefore, the ceramic molded articles are required to be charged into the drying bath continuously without any intervals.

This is especially true in the case of a ceramic molded article having a honeycombed structure in which cell walls, arranged in a honeycomb pattern to partition cells, are easily strained by being dried unevenly.

In the case where the extrusion molding process cannot be carried out continuously, therefore, the clay-like ceramic material produced by extrusion must be stored temporarily to secure a predetermined quantity of the clay-like ceramic material in the drying apparatus, in order to continuously charge them into the drying apparatus.

SUMMARY OF THE INVENTION

The present invention has been developed in view of the problems of the conventional drying apparatus, and the object of the invention is to provide a method and an apparatus for drying ceramic molded articles in which microwave energy is substantially uniformly radiated onto each ceramic molded article charged into the drying chamber and conveyed through the drying chamber, so that the ceramic molded articles are dried with a high quality and free of strains.

According to a first aspect of the invention, there is provided a ceramic molded article drying apparatus comprising a drying chamber for accommodating ceramic molded articles, a plurality of microwave generators for supplying a microwave energy having a frequency of 300 MHz to 300 GHz into the drying chamber, and a conveyor whereby the ceramic molded articles are continuously charged into, conveyed through and delivered from the drying chamber, wherein the drying chamber has arranged therein a plurality of microwave generators along the direction of conveyance of the conveyor and a detection means for detecting the distribution of the ceramic molded articles in the drying chamber, and wherein each microwave generator is adapted to change the output thereof in accordance with the distribution of the ceramic molded articles in the drying chamber.

The drying apparatus according to this aspect of the invention is so configured that the output of each of a plurality of the microwave generators arranged in the drying chamber is controlled in accordance with the distribution of the ceramic molded articles in the drying chamber.

With this drying apparatus, therefore, even in the case where the ceramic molded articles in the drying chamber have different densities, the ceramic molded articles can be irradiated with microwave energy uniformly by controlling the output of the microwave generators, and therefore the ceramic molded articles can be dried substantially uniformly. As a result, the ceramic molded articles maintaining a high accuracy immediately after the extrusion molding process are dried, and through the subsequent baking process, fabricated into ceramic molded articles of high quality.

In this aspect of the invention, as described above, a drying apparatus is provided in which ceramic molded articles charged into the drying chamber and conveyed through the drying chamber are irradiated uniformly with microwave energy thereby to produce ceramic molded articles of high quality substantially free of strains.

The output of the microwave generators can be changed either by changing the microwave energy radiation density or by changing the duration of microwave energy radiation per unit time by controlling the duty factor.

The detection means described above may be a plurality of sensors arranged at various points in the drying chamber for detecting the ceramic molded articles charged into the drying chamber. In this case, the sensors arranged at various points in the drying chamber can directly detect the distribution of the ceramic molded articles in the drying chamber.

As an alternative, the detection means may be a sensor arranged at the entrance of the drying chamber. In this case, the distribution of the ceramic molded articles in the drying chamber can be grasped indirectly, based on the time length elapsed after each ceramic molded article is charged into the drying chamber and the speed at which each ceramic molded article is conveyed by the conveyor.

According to a second aspect of the invention, there is provided a method of drying, by microwave energy radiation, a plurality of clay-like honeycombed ceramic molded articles in a drying apparatus comprising a drying chamber for accommodating the ceramic molded articles, a plurality of microwave generators arranged in the direction of conveyance in the drying chamber for radiating the microwave energy having a frequency of 300 MHz to 300 GHz, and a conveyor for continuously charging into, conveying through and delivering from, the drying chamber, the ceramic molded articles, wherein the output of each microwave generator is changed in accordance with the distribution of the ceramic molded articles in the drying chamber.

In this aspect of the invention, the output of each of a plurality of the microwave generators arranged along the direction of conveyance in the drying chamber is set in accordance with the distribution of the ceramic molded articles in the drying chamber.

According to this drying method, therefore, a train of ceramic molded articles conveyed through the drying chamber, even if arranged at irregular intervals, can be dried very uniformly. Therefore, the ceramic molded articles can be dried while maintaining the high accuracy thereof immediately after the extrusion molding process.

As described above, in this aspect of the invention, a method of drying ceramic molded articles is provided in which the microwave energy is radiated uniformly on the ceramic molded articles charged into and conveyed through the drying chamber and, therefore, the ceramic molded articles can be dried with a high quality and substantially free of strains.

The present invention may be more fully understood from the description of preferred embodiments of the invention, as set forth below, together with the accompanying drawings.

BRIEF DESCRIPTION OF THE DRAWINGS

In the drawings:

FIG. 13 is a sectional view showing a drying apparatus for ceramic molded articles according to a third embodiment of the present invention.

DESCRIPTION OF THE PREFERRED EMBODIMENTS (First Embodiment)

A drying apparatus for ceramic molded articles according to an embodiment of the invention is explained with reference to FIGS. 1 to 5.

Figure 2:
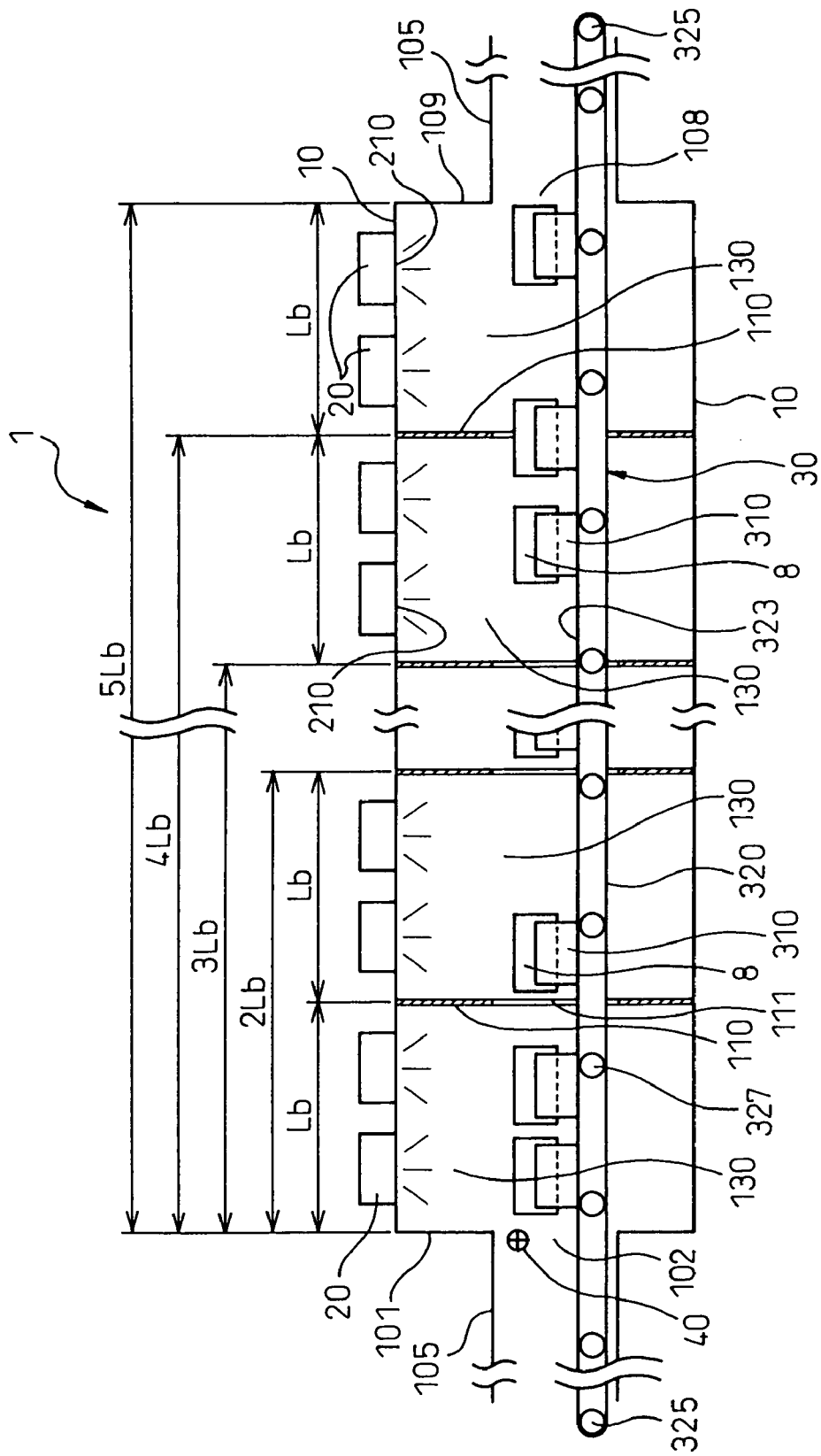
FIG. 2 is a sectional view of a ceramic molded article drying apparatus according to the first embodiment of the present invention.

A drying apparatus 1 according to this embodiment, as shown in FIG. 2, comprises a drying chamber 10 for accommodating a plurality of ceramic molded articles 8 (FIG. 4), a plurality of microwave generators 20 for supplying the microwave energy in the frequency range of 300 MHz to 300 GHz into the drying chamber 10, and a conveyor 30 whereby the ceramic molded articles 8 are continuously charged into, conveyed through and delivered out of the drying chamber 10.

The drying chamber 10 has arranged therein a plurality of microwave generators 20 along the direction of conveyance of the conveyor 30, and a sensor 40 for detecting the distribution of the ceramic molded articles 8 in the drying chamber 10.

The output of each microwave generator 20 is adapted to be changed in accordance with the distribution of the ceramic molded articles 8 detected by the sensor 40.

The configuration of this apparatus is described more in detail below.

Figure 4:
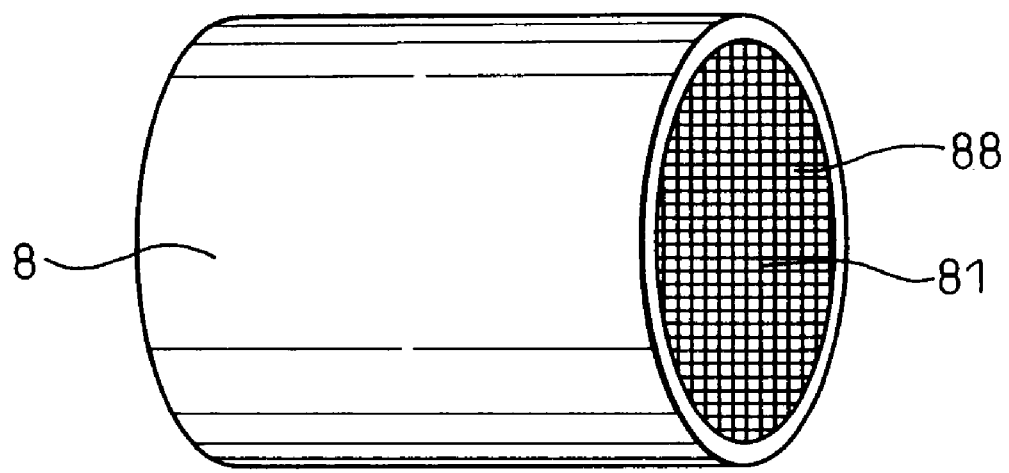
FIG. 4 is a perspective view showing a ceramic molded article according to the first embodiment of the present invention.

Each of the ceramic molded articles 8 produced by extrusion according to this embodiment is, and as shown in FIG. 4, a ceramic molded article having a honeycombed structure used as a catalyst carrier of an exhaust gas purification system of automobiles.

The ceramic molded article 8 having a honeycombed structure is formed of a multiplicity of cells 88 segmented by partitioning walls 81 of ceramic, and has a substantially cylindrical outline.

Especially, in order to maintain a high purification performance while suppressing the flow resistance of the exhaust gas as a honeycombed molded article, the ceramic molded article 8 has the partitioning walls 81 as thin as not more than 150 μm and a diameter of not more than 300 mm, as shown in FIG. 4. Also, the axial length of the ceramic molded article 8 is not more than 1000 mm.

Figure 1:
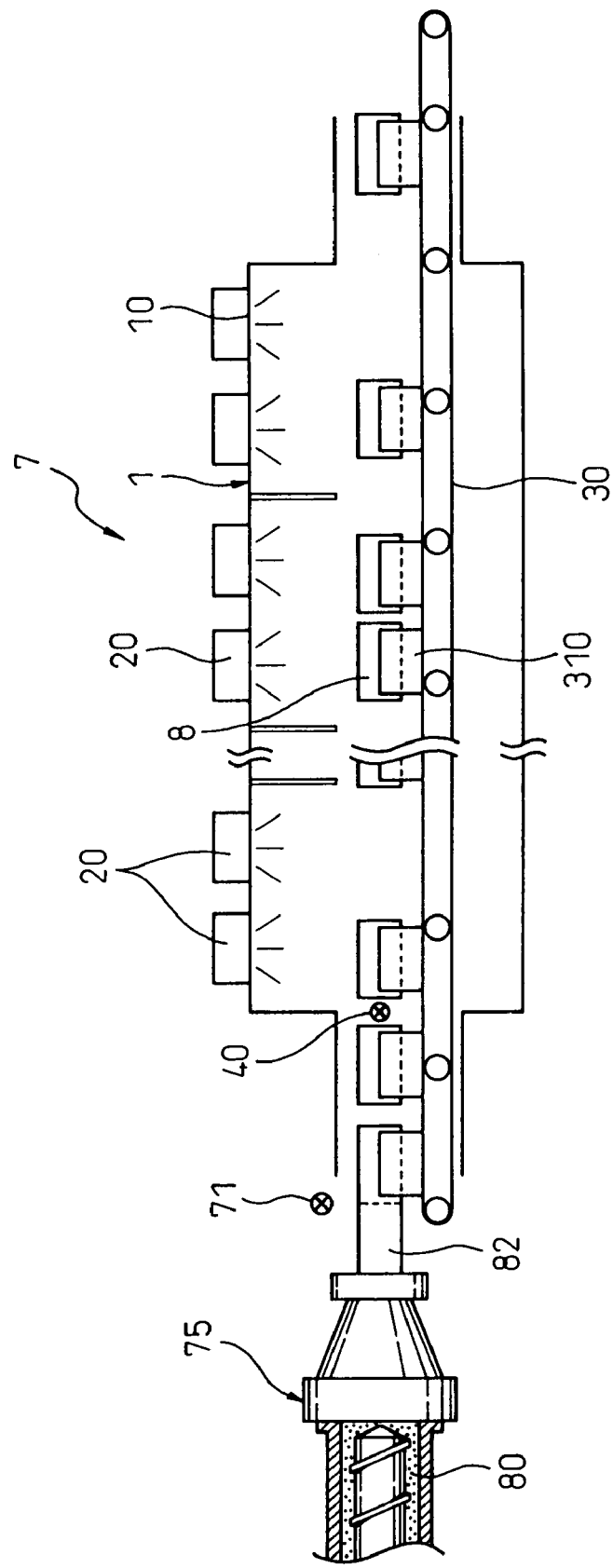
FIG. 1 is a diagram for explaining a ceramic molded article production apparatus according to a first embodiment of the present invention.

In addition to the drying apparatus 1, an apparatus 7 for producing the ceramic molded articles 8 according to this embodiment, as shown in FIG. 1, includes an extrusion molding machine 75 for extrusion-molding a rod-shaped ceramic molded article 82 having a honeycombed structure and extended like a rod, a cutting machine 71 for cutting the ceramic molded articles 8 from the rod-shaped ceramic molded article 82 fabricated by extrusion and a baking unit (not shown) for baking the dried ceramic molded articles 8.

Figure 3:
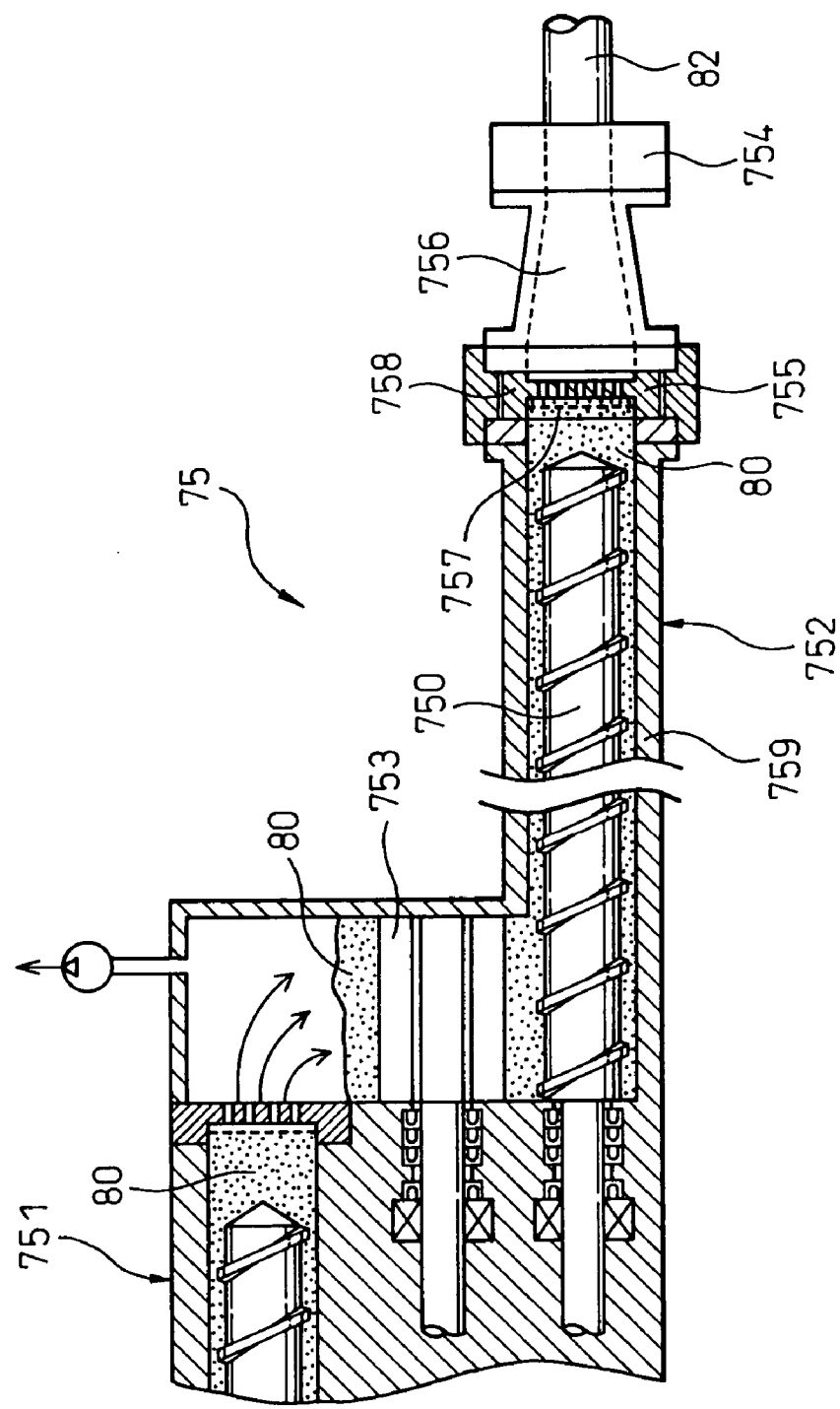
FIG. 3 is a sectional view of an extrusion molder for ceramic molded articles according to the first embodiment of the present invention.

The extrusion molding machine 75 includes, as shown in FIG. 3, extruders 751, 752 in two stages. The extrusion molding machine 75 is so configured that the ceramic material 80 supplied to the upper screw extruder 751 is advanced while being kneaded and supplied to the lower screw extruder 752 through a filter 753.

The number of stages of the screw extruders of the extrusion molding machine 75 is not limited to two, but may be either three or more or only one.

The lower-stage portion of the extrusion molding machine 75, as shown in FIG. 3, includes a molding die 754 for extrusion-molding the ceramic material 80, a screw extruder 752 for supplying the ceramic material 80 to the molding die 754 and a filter device 755 for filtering the ceramic material 80 at the outlet of the screw extruder 752.

The molding die 754, as shown in FIG. 3, is for forming the ceramic material 80 supplied thereto into a rod-shaped ceramic molded article 82. A longitudinally hollow resistance tube 756 having a substantially circular cross section with the inner diameter thereof progressively decreased toward the molding die 754 from the screw extruder 752 is interposed between the molding die 754 and the screw extruder 752.

The filter device 755, as shown in FIG. 3, includes a filter net 757 and a support member 758 for supporting the filter net 757. The support member 758 is made of a metal and has a multiplicity of through holes for passing the ceramic material 80. The filter net 757 is formed of thin stainless steel strands woven into a fine mesh.

The screw extruder 752, as shown in FIG. 3, includes a longitudinally hollow screw housing 759 with an extruding screw 750 built therein.

The extruding screw 750 is spirally wound with a strand of a pressure lead on the outer peripheral surface of a rotating screw shaft. This pressure lead imparts pressure on the ceramic material 80 and advances, while kneading, the ceramic material 80 toward the molding die 754.

The cutter 71, as shown in FIG. 1, has a cutting wire (not shown) suspended in horizontal direction substantially at right angles to the axis of the rod-shaped ceramic molded articles 82. The cutting wire is reciprocated along the longitudinal direction thereof while at the same time moving vertically downward to cut off the rod-shaped ceramic molded article 82.

According to this embodiment, the cutter 71 is so configured as to cut out ceramic molded articles each having an axial length of not more than 1000 mm from the rod-shaped ceramic molded article 82 extruded from the extrusion-molding machine 75.

The drying apparatus 1, as shown in FIG. 2, is so configured that ten microwave generators 20 are arranged along the direction of conveyance in the drying chamber 10 capable of accommodating a maximum of 50 clay-like ceramic molded articles 8. In the drying apparatus 1, a drying chamber 10 is formed in such a position as to surround the conveyor 30 for conveying the ceramic molded articles 8.

The conveyor 30 includes, as shown in FIG. 2, two rollers 325 arranged at the longitudinal ends along the direction of conveyance, a plurality of level rollers 327 for holding the belt in horizontal position and an endless loop belt 320 suspended over the rollers.

The rollers 325 and the level rollers 327 have a horizontal rotary shaft substantially at right angles to the direction of extrusion of the rod-shaped ceramic molded article 82 and parallel to the floor surface, not shown. The rollers 325 connected to a rotary motor, not shown, transmit the turning torque thereof to the belt 320 and advances the rests 310 on the conveyance surface 323 of the belt 320 in the direction of extrusion of the rod-shaped ceramic molded article 82.

The rests 310, as shown in FIG. 2, have a concave cross section to fit along the outer peripheral surface of the clay-like ceramic molded articles 8. According to this embodiment, the rests 310 are made of a material of low restitution such as sponge-like porous polyurethane resin. The axial length of the rest 310 is 80 to 980 mm.

The sponge-like porous material is used in order not to prevent the scattering of the water contained in the ceramic molded articles 8 in the drying apparatus 1. The cross section of the rest 310 is formed to fit along the outer peripheral surface of the ceramic molded articles 8 in order to decrease the deformation of the ceramic molded articles 8 by increasing the contact area for a lower contact surface pressure between each rest 310 and the corresponding ceramic molded article 8.

By way of reference, the rests 310 may be made of any other materials whose temperature rise due to microwave energy is smaller than that of the ceramic molded articles 8. Specifically, the rest 310 may be properly formed of a material of which the dissipation factor (product of specific dielectric constant and loss tangent delta) against the microwave energy is smaller than that of the ceramic material 80. The smaller the dissipation factor, the more the temperature rise due to microwave energy is suppressed, and therefore the rests 310 can be kept at a lower temperature than the ceramic molded articles 8.

Examples of other applicable materials than polyurethane resin used in this embodiment include melamine resin, Teflon (registered trade mark) resin, mica resin, alumina resin, polyethylene resin and silicon resin.

The drying chamber 10 is a tubular body having a substantially rectangular cross section, and the conveyor 30 is arranged in the tubular body. An inlet wall 101 and an outlet wall 109 are formed on the end surfaces, respectively, of the tubular body. The walls 101, 109, through which the conveyor 30 is passed, are formed with an inlet opening 102 and an outlet opening 108 substantially in the same shape for passing the ceramic molded articles 8 placed on the conveyor 30.

A cylindrical duct 105 having a cross section in substantially the same shape as the inlet opening 102 and the outlet opening 108 extends from each of the inlet opening 102 and the outlet opening 108. A radio wave absorber arranged on the inner wall surface of the ducts 105 reduces the leakage of microwave energy from inside to outside of the drying bath 10.

A plurality of partitioning walls 110 are formed in the drying chamber 10 substantially at right angles to the direction of conveyance of the conveyor 30. The partitioning walls 110 are each formed with an opening 111 having substantially the same shape as the inlet opening 102 and the outlet opening 108, and have the outer peripheral edge thereof formed to fit closely along the inner wall surface of the drying bath 10.

According to this embodiment, four partitioning walls 110 are arranged equidistantly along the direction of conveyance. These partitioning walls 110 form five drying blocks 130 including the first (at the inlet side) to the fifth (at the outlet side) drying blocks in the drying chamber 10. In this embodiment, Lb designates the length of each drying block 130 along the direction of conveyance.

Figure 5:
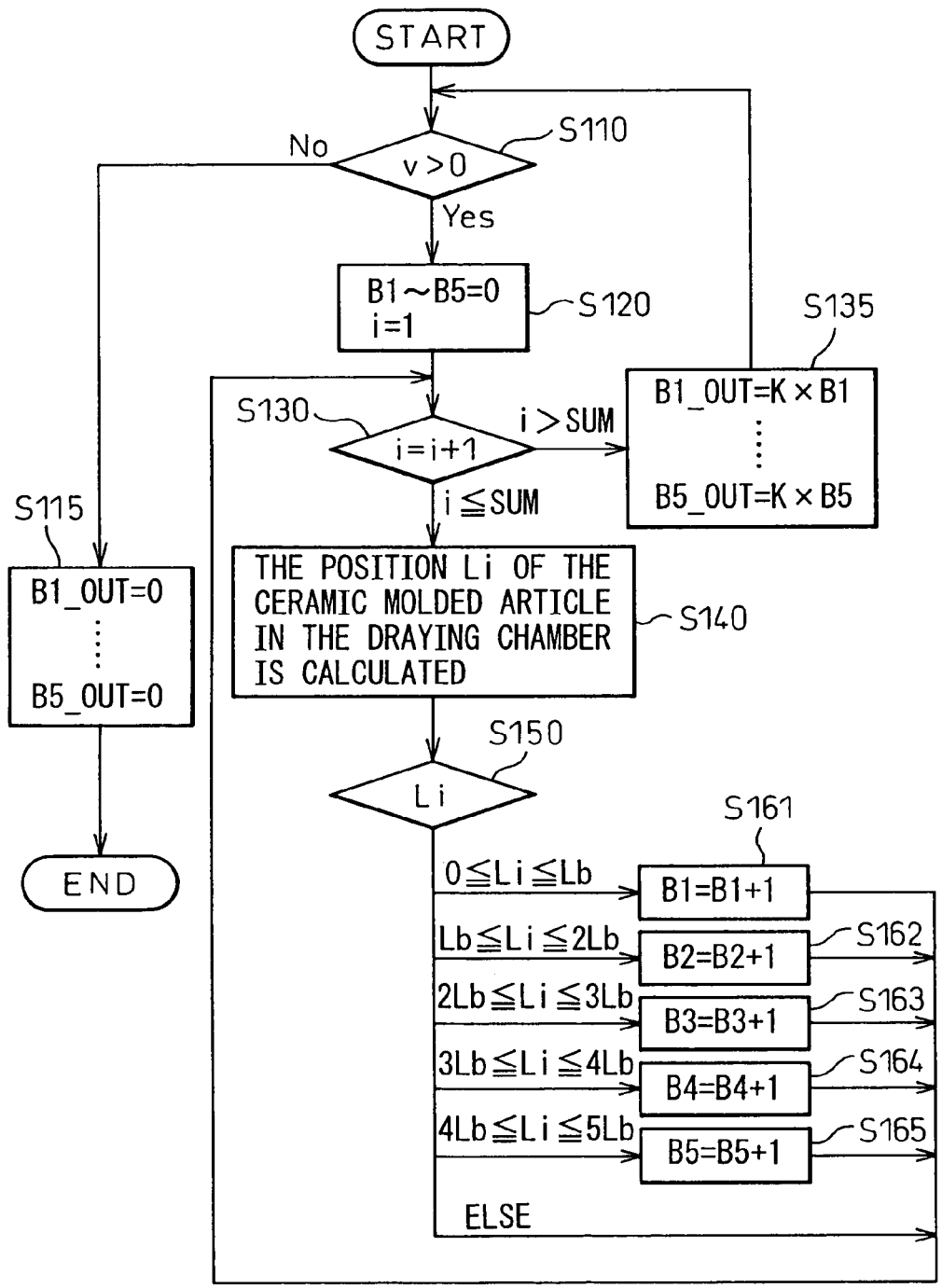
FIG. 5 is a flowchart showing the steps of calculating the output value of each microwave generator according to the first embodiment of the present invention.
Figure 6:
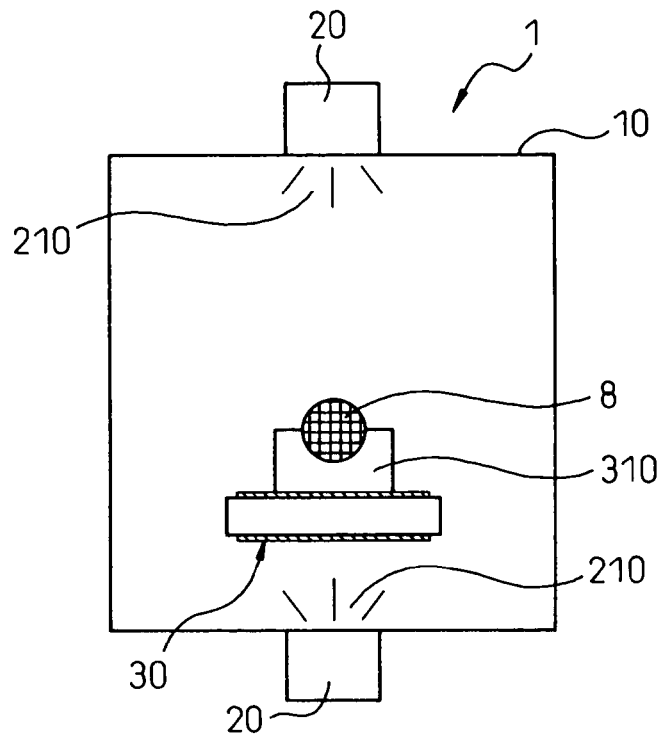
FIG. 6 is a sectional view taken along the direction substantially at right angles to the direction of conveyance, showing the arrangement of microwave energy radiation ports of a drying chamber according to the first embodiment of the present invention.

The drying blocks 130 may have different lengths along the direction of conveyance. As long as the position of each drying block 130 in the drying chamber is grasped, each microwave generator 20 can be properly controlled by the control method according to the invention described later (FIG. 5).

Each drying block 130 has two microwave generators 20 as shown in FIG. 2. Each microwave generator 20 connected to a control unit described later is adapted to radiate microwave energy based on a control signal from the control unit.

According to this embodiment, each drying block 130 has two microwave generators 20 arranged along the direction of conveyance. Each microwave generator 20 is configured to radiate microwave energy from a corresponding radiation port 210 formed in the upper inner wall surface of the drying chamber 10.

A light-emitting unit and a photo-detector making up a photoelectric tube sensor 40 are arranged on the two sides of the entrance of the drying chamber 10 substantially at right angles to the direction of conveyance. This sensor 40 is configured to detect the ceramic molded articles 8 charged into the drying chamber 10 which shield the infrared light ray emitted from the light-emitting unit toward the photo-detector.

A control unit (not shown) includes an I/O for transmitting and receiving signals to and from external devices such as the sensor 40 and the microwave generators 20, a RAM for storing the detection signal of the sensor,40, a ROM for storing a calculation program and a CPU for executing the calculation program.

The I/O is supplied with the detection signal of the sensor 40 and the conveyance speed data of the conveyer 30 and outputs a control signal to each microwave generator 20.

The CPU calculates the quantity of the ceramic molded articles 8 associated with each drying block 130 based on the charge data prepared from the detection signal of the sensor 40 and the conveyance speed of the conveyor 30. Further, the CPU calculates a proper output value of each microwave generator 20 and outputs a control signal to each microwave generator 20 in accordance with the quantity of the ceramic molded articles 8 of each drying block 130.

The control unit according to this embodiment has dual functions as a detector for calculating the distribution of the ceramic molded articles 8 in the drying chamber 10 in response to the detection signal of the sensor 40 and as a controller for properly controlling the output of each microwave generator 20.

Further, a baking unit not shown is configured to bake the dried ceramic molded articles 8 at a predetermined baking temperature.

Also, an end surface machining unit not shown includes a chuck for fixing the baked ceramic molded articles 8 and a cutting wire fed in the direction substantially at right angles to the axis of the ceramic molded articles 8 in the chuck. The cutting wire cuts off the end surface of each ceramic molded article 8 to produce the ceramic molded article 8 as a final product.

Next, a method of fabricating the ceramic molded articles 8 by the production apparatus 7 having the above-mentioned configuration is explained.

For producing the rod-shaped ceramic molded article 82 by the extrusion-molding machine 75 according to this embodiment, as shown in FIG. 1, the first step is to charge the ceramic material 80 kneaded by the upper screw extruder 751, upstream of the lower screw extruder 752. The ceramic material 80 pressured by the extrusion screw 750 is advanced toward the molding die 754. The ceramic material 80 is supplied to the molding die 754 thereby to extrude the clay-like rod-shaped ceramic molded article 82.

Next, as shown in FIG. 1, the rod-shaped ceramic molded article 82 is cut by the cutter 71 into a plurality of ceramic molded articles 8 each having an axial length of not more than 1,000 mm. After that, the clay-like ceramic molded articles 8 placed on the rests 310 are placed on the conveyor 30 of the drying apparatus 1 and conveyed sequentially.

The ceramic molded articles 8 placed on the conveyor 30, as shown in FIG. 2, are charged into the drying chamber 10 and conveyed through the drying chamber 10. In the process, the sensor 40 arranged at the entrance of the drying chamber 10 detects the presence or absence of the ceramic molded article 8 and outputs a detection signal indicating "presence" or "absence".

The control unit, upon receipt of a detection signal indicating "presence" from the sensor, stores the current time in the RAM. In this way, the charge data constituting the history data representing the time points when the ceramic molded articles 8 are charged are produced in the RAM.

On the other hand, the CPU of the control unit processes the charge data based on the conveyance speed (m/s) of the conveyor 30, and calculates the distribution of the ceramic molded articles 8 in the drying chamber 10 at the current time. In this way, the quantity of the ceramic molded articles 8 included in each drying block 130 is calculated.

Further, the control unit transmits an output value proportional to the quantity of the ceramic molded articles 8 to the microwave generators 20 arranged in each drying block 130. Each microwave generator 20 is thus set to the particular output value and supplies a predetermined amount of microwave energy to each drying block 130.

According to this embodiment, a series of the process shown in the flowchart of FIG. 5 is executed. Specifically, based on the charge data, the quantity of the ceramic molded articles 8 in each drying block 130 is calculated, and in accordance with this quantity, each microwave generator 20 is operated.

According to the process shown in the flowchart, the first step S110 is to determine the conveyance speed v (m/s) of the conveyor 30. In the case where the conveyor 30 is stationary, the outputs B1_OUT to B5_OUT of the microwave generators 20 arranged in the drying blocks 130 are set to zero in step S115 and the program is terminated.

The character B1_OUT indicates a set output of each microwave generator 20 installed in the first drying block. In similar fashion, characters B2_OUT to B5_OUT indicate the set outputs of the microwave generators 20 installed in the second to fifth drying blocks, respectively.

As long as the conveyor 30 is in operation, on the other hand, the variables B1 to B5 indicating the quantity of the ceramic molded articles 8 in the first to fifth drying blocks arranged along the direction of conveyance from the molding die 754 in the drying chamber 10 and the variable i providing the counter of the ceramic molded articles 8 in the drying chamber 10 are set to the initial values in step S110. According to this embodiment, the initial values of the variables B1 to B5 and the variable i are set to zero.

In step S130, the variable i is counted up, and the relation between the variable i thus counted up and the constant SUM indicating the maximum number of the ceramic molded articles 8 which can be accommodated in the drying chamber 10 is determined. In the case under consideration, a series of calculating process starting from S140 is repeated until the variable i exceeds the constant SUM. In this series with the calculating process, the drying block 130 associated with the i-th charged ceramic molded article 8 is specified retrospectively from the current time point, and the corresponding one of the variables B1 to B5 representing the quantity of the ceramic molded articles 8 in the particular drying block 130 is accumulated.

In the case where the variable i exceeds the constant SUM, on the other hand, the process proceeds to step S135, where the output values of the microwave generators 20 are set to B1_OUT to B5_OUT in accordance with the quantities B1 to B5 of the ceramic molded articles 8 the respective drying blocks 130. According to this embodiment, the output value of each microwave generator 20 is calculated by multiplying the quantity of the ceramic molded articles 8 in the particular drying block by the constant K.

The constant K is an experimentally determined proper output value of a given microwave generator 20 arranged in the drying block 130 in the case where only one ceramic molded article 8 exists in the particular drying block 130.

In step S140, the charge data in the RAM of the control unit is accessed, and the time Ti (s) when the i-th ceramic molded article 8 is charged into the drying chamber 10 is read retrospectively from the current time Tnow (s). The difference between time Tnow and Ti is multiplied by the conveyance speed v (m/s) of the conveyor 30. In this way, the position of the i-th ceramic molded article 8 in the drying chamber 10, i.e. the distance Li (m) along the direction of conveyance from the position of the sensor 40 is calculated.

Further, in step S150, the position Li (m) of a given ceramic molded article 8 is compared to the boundary positions (0, Lb, 2Lb, 3Lb, 4Lb, 5Lb) of the drying blocks 130 thereby to identify the drying block 130 associated with the i-th ceramic molded article 8.

Once the drying block 130 associated with this ceramic molded article 8 is identified, the corresponding one of the variables B1 to B5 representing the quantity of the ceramic molded articles 8 existing in the particular drying block 130 is accumulated in the corresponding one of steps S161 to S165. In the case where the particular ceramic molded article 8 belongs to none of the drying blocks 130, on the other hand, none of the variables B1 to B5 is accumulated and the process returns to step S130.

In the control unit according to this embodiment, the process in the flowchart of FIG. 5 is executed repeatedly in the control cycles of 0.2 seconds in parallel to the production of the charge data in the RAM. With the progress of the ceramic molded articles 8 through the drying chamber 10, the ever-changing quantity of the ceramic molded articles 8 in each drying block 130 is grasped. In accordance with this quantity, the outputs B1_OUT to B5_OUT of the microwave generators 20 are properly changed and set.

In this way, each ceramic molded article 8, from the time when charged into the drying chamber 10 to the time when delivered out of the drying chamber 10, moves through the five drying blocks 130 including the first to fifth ones, while being kept irradiated with the proper amount of microwave energy. The ceramic molded articles 8 irradiated with microwave energy this way are dried and hardened by discharging internal water.

The dried ceramic molded articles 8 are removed from the rests 310 and charged into the baking device. The ends of the ceramic molded articles 8 thus baked are cut off by the end surface machining device. In this way, each ceramic molded article 8 is completed as a final product.

With the drying apparatus 1 of the ceramic molded articles 8 according to this embodiment, even in the case where the train of the ceramic molded articles 8 are arranged at irregular intervals in the drying chamber 10, a substantially uniform amount of microwave energy is radiated on each ceramic molded article 8 by appropriately adjusting the output value of the microwave generators 20. As a result, the ceramic molded articles 8 in the drying apparatus 1 are neither overdried nor remain undried.

In the drying apparatus 1 according to this embodiment, the ceramic molded articles 8 extruded can be dried and hardened with high accuracy. The dried ceramic molded articles 8 are then subjected to the baking process and the end-machining process with a still higher accuracy. In this way, ceramic molded articles 9 of high quality are fabricated.

The microwave generators 20 with the microwave energy radiation output thereof changeable according to this embodiment may be replaced with equal effect by microwave generators of fixed output.

In the case where the microwave generators of fixed output are employed, preferably, the on/off cycles of predetermined period are repeated, while at the same time controlling the duty factor representing the on/off time ratio in each cycle. By controlling the duty factor of the microwave generators of fixed output, the amount of microwave energy radiated per unit time can be changed.

According to this embodiment, the microwave energy radiation port 210 of each microwave generator 20 is formed in the upper surface of the drying chamber 10. As an alternative, the microwave generators 20 are arranged on the upper and lower surfaces of the drying chamber 10, and the radiation ports 210 of each microwave generator 20 may be formed in the upper surface and the bottom surface of the drying chamber 10.

In this case, each ceramic molded article 8 is irradiated with microwave energy from above and below and therefore the portions of the ceramic molded article 8 can be dried with a still higher uniformity.

Figure 7:
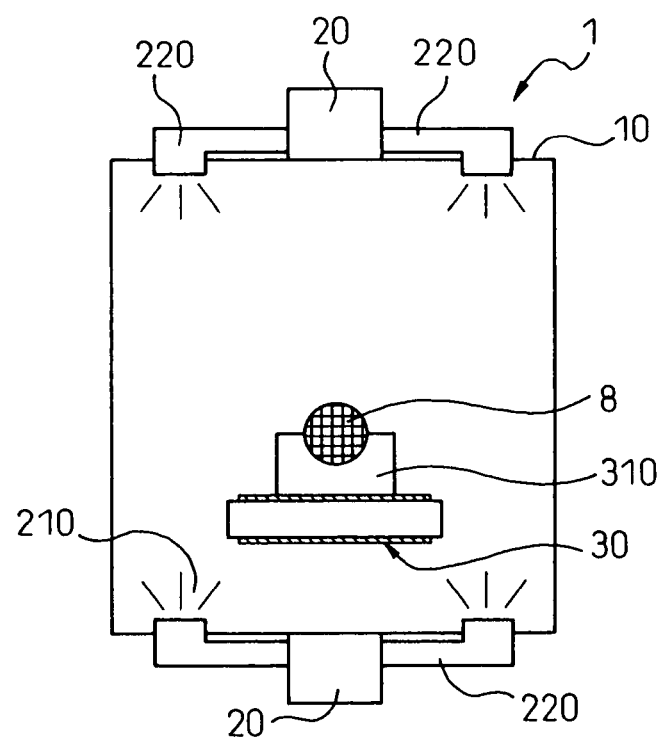
FIG. 7 is a sectional view taken along the direction substantially at right angles to the direction of conveyance, showing the arrangement of microwave energy radiation ports of another drying chamber according to the first embodiment of the present invention.

As another alternative, as shown in FIG. 7, the microwave generators 20 are arranged on the upper and lower surfaces of the drying chamber 10, and that end of each of two waveguides 220 connected to each of the microwave generators 20 which is far from the corresponding microwave generator 20 proper and constitutes a radiation port 210 is arranged near an end of each of the upper and bottom surfaces of the drying chamber 10.

In this case, the microwave energy is radiated from points near the four corners of a substantially rectangular cross section of the drying chamber 10 having the upper and lower surfaces substantially at right angles to the direction of conveyance, so that all the portions of the ceramic molded article 8 can be dried with even higher uniformity.

Figure 8:
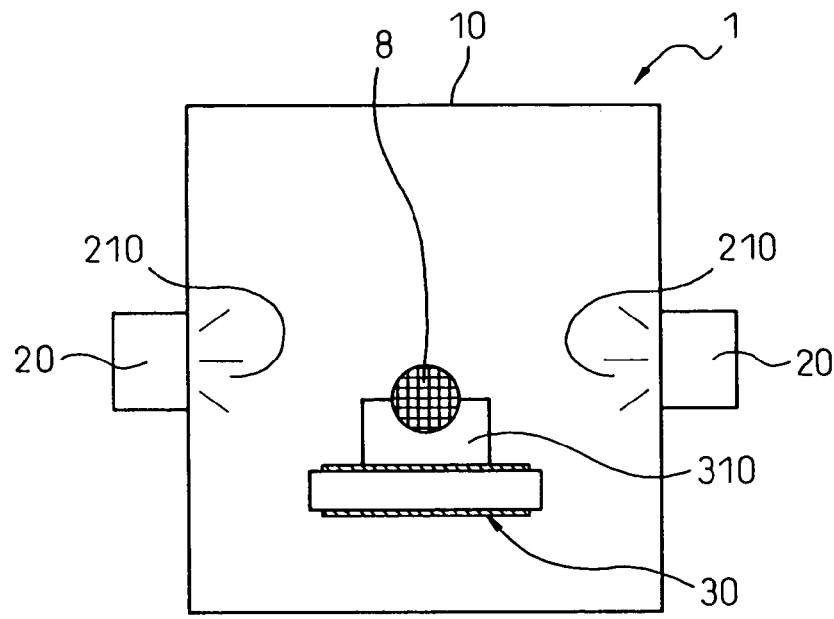
FIG. 8 is a sectional view taken along the direction substantially at right angles to the direction of conveyance, showing the arrangement of microwave energy radiation ports of still another drying chamber according to the first embodiment of the present invention.

As still another alternative, the microwave generators 20, as shown in FIG. 8, are arranged on the lateral sides of the drying chamber 10, respectively, and the radiation ports 210 of the microwave generators 20 are formed in the lateral side surfaces, respectively, of the drying chamber 10.

In this case, each ceramic molded article 8 is irradiated with microwave energy from the two lateral sides, and therefore all the portions thereof can be dried with still higher uniformity.

Figure 9:
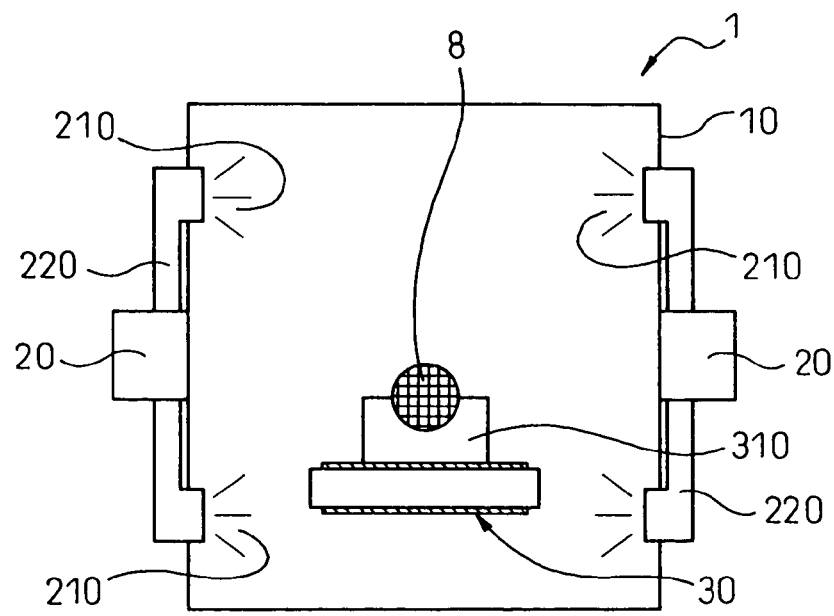
FIG. 9 is a sectional view taken along the direction substantially at right angles to the direction of conveyance, showing the arrangement of microwave energy radiation ports of yet another drying chamber according to the first embodiment of the present invention.

As yet another alternative, the microwave generators 20, as shown in FIG. 9, are arranged on the two lateral sides of the drying chamber 10, with the radiation ports 210 of the microwave generators 20 arranged near the upper and lower ends, respectively, of the lateral sides of the drying chamber 10.

In this case, the microwave energy is radiated from points near the four corners of a substantially rectangular cross section substantially at right angles to the direction of conveyance in the drying chamber 10. Thus, the portions of the ceramic molded article 8 can be dried with even higher uniformity.

(Second Embodiment)

According to this embodiment, a plurality of drying areas adapted to move with the operation of the conveyor are formed in place of the drying blocks fixedly arranged in the drying chamber in the first embodiment.

Figure 10:
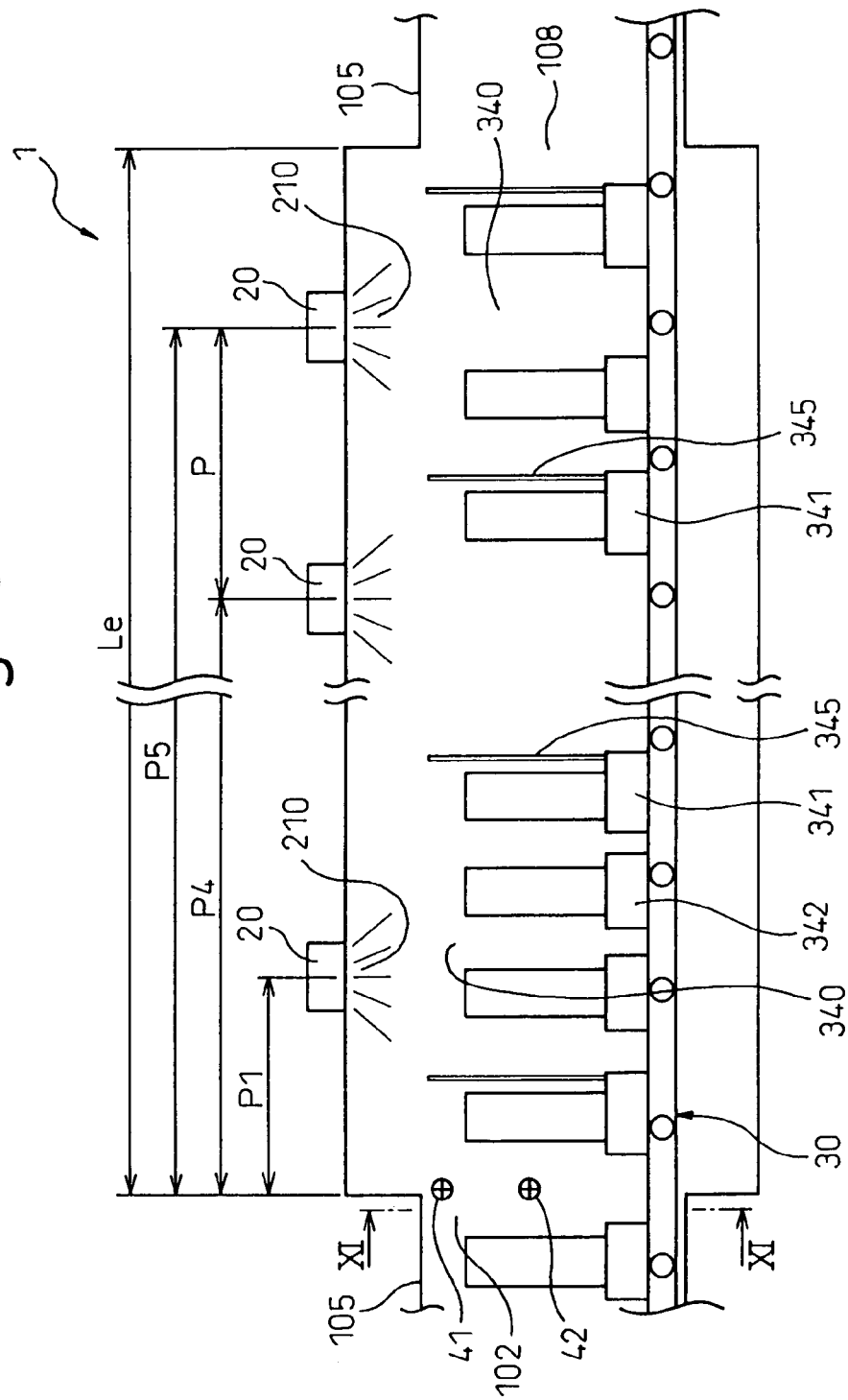
FIG. 10 is a sectional view showing a drying apparatus for ceramic molded articles according to a second embodiment of the present invention.

In this embodiment, as shown in FIG. 10, a plurality of reflectors 345 for reflecting the microwave energy are mounted on a part of the rests in place of the partitioning walls of the drying chamber according to the first embodiment. The reflectors 345 make up drying areas 340 in the drying chamber 10. Also, the ceramic molded articles 8 placed on the rests are set vertically instead of horizontally.

This embodiment is specifically described below.

In the drying apparatus 1 according to this embodiment, a substantially tabular reflector 345 for reflecting the microwave energy is mounted substantially at right angles to the direction of conveyance at the end portion of each of at least a part of the rests along the direction of conveyance.

Each microwave generator 20 is adapted to change the output thereof in accordance with the quantity of the ceramic molded articles 8 existing in the drying area 340 formed between the adjacent reflectors 345 in the drying chamber 10.

In the description of this embodiment, those rests that have the reflector 345 are designated as first rests 341 and those not having the reflector 345 are designated as second rests 342.

Figure 11:
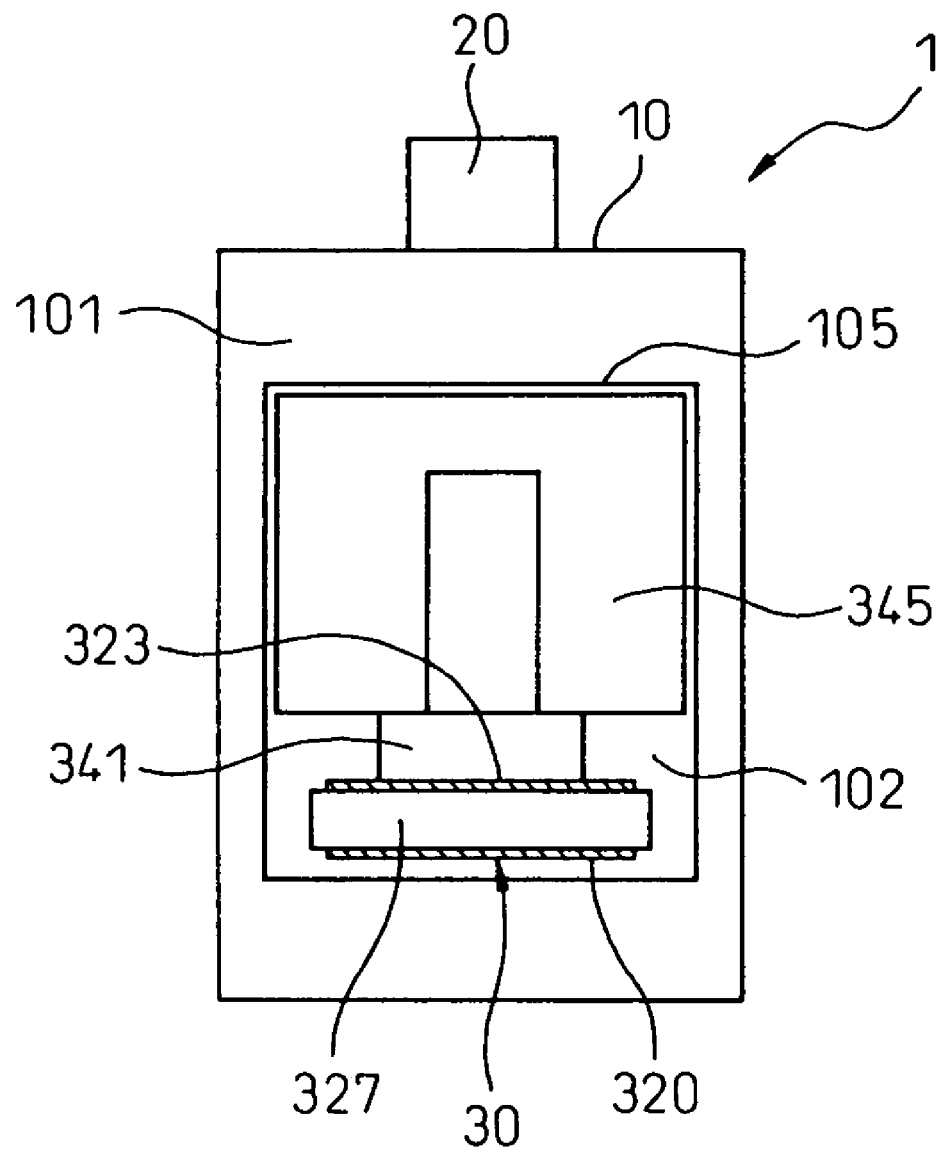
FIG. 11 is a sectional view taken in line XI-XI in FIG. 10, showing the drying apparatus for ceramic molded articles according to the second embodiment of the present invention.

According to this embodiment, as shown in FIG. 11, each reflector 345 is formed to such a size as to cover the cross section of the ceramic molded articles 8 placed on the rests along the direction of conveyance while at the same being recoverable through the inlet opening 102 and the outlet opening 108, as shown in FIG. 11.

Unlike the drying blocks fixedly arranged in the drying chamber according to the first embodiment, the drying areas 340 according to this embodiment are moved with the movement of the conveyor 30.

As a result, the relation between a given drying area 340 and the microwave generator 20 for supplying microwave energy to the particular drying area 340 undergoes a constant change. On the other hand, the quantity of the ceramic molded articles 8 existing in the drying area 340 remains unchanged.

Further, the drying chamber 10 according to this embodiment, as shown in FIG. 10, includes a sensor 42 for detecting the ceramic molded articles 8 and a sensor 41 for detecting the reflectors 345 arranged near the inlet opening 102. According to this embodiment, the two sensors 41, 42 installed at different heights are arranged taking advantage of the height difference between the ceramic molded article 8 and the reflector 345. The lower sensor 42 is adapted to detect the ceramic molded articles 8, and the upper sensor 41 to detect the reflectors 345.

The drying chamber 10 has five microwave generators 20 arranged equidistantly along the direction of conveyance, which are designated as first to fifth microwave generators from the inlet side. According to this embodiment, the five microwave generators 20 including the first to fifth microwave generators are arranged at positions P1, P2, P3, P4 and P5, respectively, from the inlet side of the drying chamber 10 over the length Le of the drying chamber 10 along the direction of conveyance.

The microwave generators 20 are arranged not necessarily equidistantly but at irregular intervals. As long as the position of each microwave generator 20 in the drying chamber 10 is known, each microwave generator 20 can be properly controlled by the control method (FIG. 12) described later.

In the drying apparatus 1 according to this embodiment, the microwave generators 20 are arranged at regular intervals P.

Next, a method of drying the ceramic molded articles 8 by the drying apparatus 10 having the above-mentioned configuration is explained.

The undried ceramic molded articles 8 are placed on the first rests 341 or the second rests 342 and sequentially charged into the drying chamber 10. The first rests 341 with the reflector 345 mounted thereon are charged at predetermined intervals, and during these intervals, the second rests 342 are charged from time to time.

According to this embodiment, the first rests 341 with the ceramic molded articles 8 mounted thereon are charged in such a manner that the interval between the reflectors 345 of the first rests 341 adjacently conveyed is in the range of 30% to 200% of the interval P between the adjacent microwave generators 20. During this interval of the reflectors 345, the second rest 342 carrying the ceramic molded article 8 is charged from time to time.

The sensor 41 arranged at the inlet of the drying chamber 10 detects whether there exists the reflector 345 or not, and outputs a detection signal indicating "presence" or "absence".

The lower sensor 42, on the other hand, detects whether there exists the ceramic molded article 8 and outputs a detection signal indicating "presence" or "absence".

The control unit not shown, upon receipt of the detection signal of "presence" from the sensor 41 for detecting a reflector 345, stores the current time point in the RAM as an area starting time indicating the head of the drying area 340.

Also, the control unit accumulates the number of times the ceramic molded articles 8 are detected by the sensor 42, i.e. the number of the ceramic molded articles 8 that have passed the sensor 42, and sets this number as an in-area quantity Si.

Upon detection of a new reflector 345 by the sensor 41, the current time point is stored in the RAM with the in-area quantity Si related to the area starting time as an area end time indicating the tail end of the drying area 340.

The area end time is an area starting time indicating the head of the next drying area 340.

In this way, as the ceramic molded articles 8 are conveyed, the control unit sequentially stores the individual information for the drying areas 340 in the RAM and thus produces a series of area data.

The individual information in the area data includes, as related to each other, the area starting time when the head of a drying area 340 is charged into the drying chamber 10, the in-area quantity Si indicating the quantity of the ceramic molded articles 8 in the drying area 340 and the area end time when the tail end of the drying area 340 is charged into the drying chamber 10.

Further, the control unit calculates the output value of each microwave generator 20 based on the area data, and operates the microwave generators 20 based on the output values of the microwave generators 20.

The control unit processes the area data including the area starting time and the area end time based on the conveyance speed (m/s) of the conveyor 30. Thus, the positions of the head and the tail end of the drying area 340 in the drying chamber 10 at the current time are calculated on the one hand, and the microwave generators 20 for supplying microwave energy to the drying areas 340 are specified on the other.

Furthermore, the control unit transmits an output value proportional to the in-area quantity indicating the quantity of the ceramic molded articles 8 in a given drying area 340 to the microwave generator 20 for supplying the microwave energy to the particular drying area 340. Each microwave generator 20 is then set to the particular output value and supplies a predetermined amount of microwave energy to each drying area 340.

Figure 12:
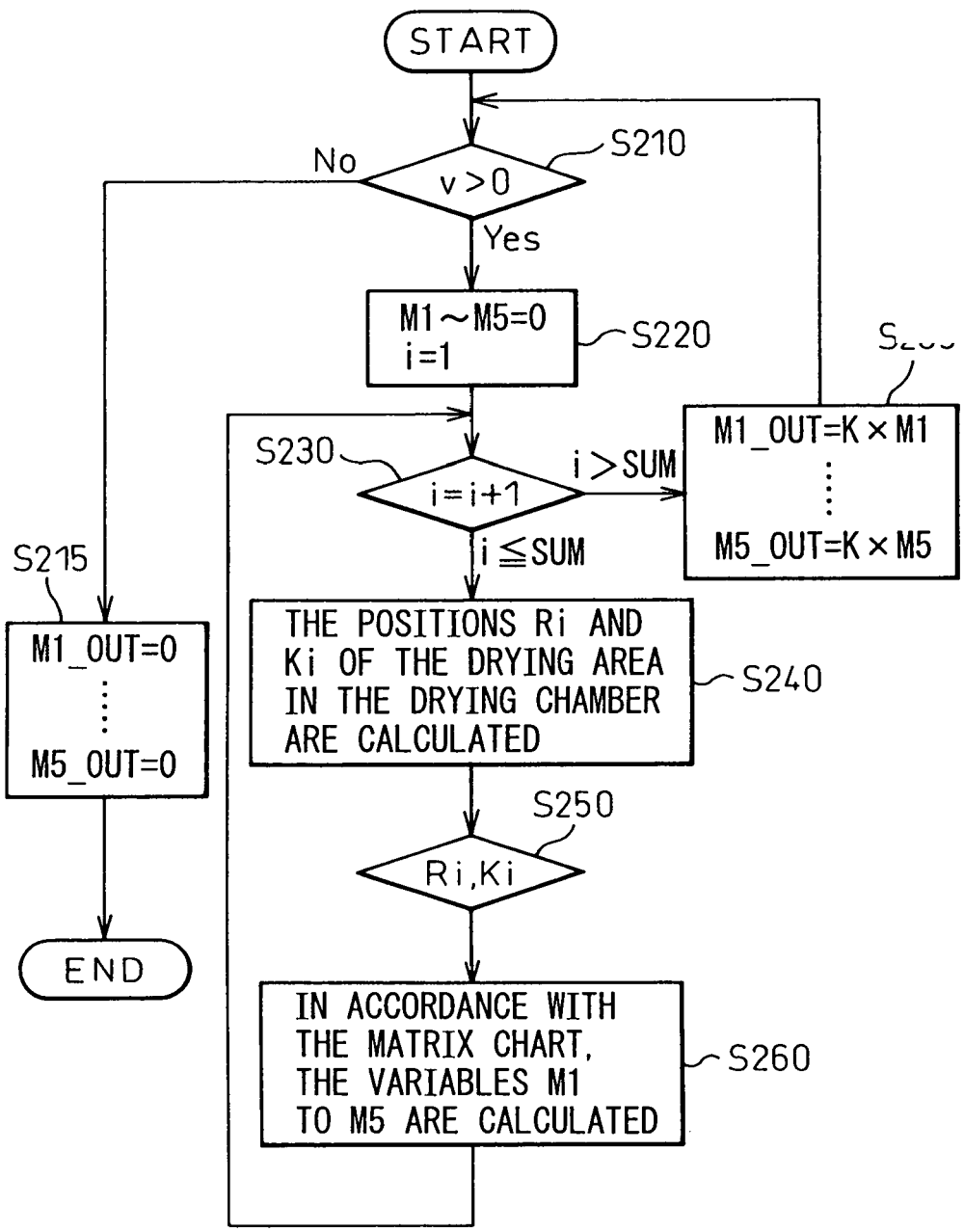
FIG. 12 is a flowchart showing the steps of calculating the output value of each microwave generator according to the second embodiment of the present invention.

According to this embodiment, the microwave generators 20 are controlled, as described above, based on the area data according to the flowchart shown in FIG. 12. This process is explained specifically below.

Further, in step S250, based on the values Ri and Ki thus calculated, which state of the matrix chart shown in Table 1 is assumed by the i-th drying area 340 or whether none of the states of the matrix chart is assumed by the i-th drying area 340 is determined. In this table, each column indicates the head position Ri of the drying area 340 and each row indicates the tail end position Ki of the drying area 340.

TABLE 1

|  | $0 \leq Ri < P1$ | $P1 \leq Ri < P2$ | $P2 \leq Ri < P3$ | $P3 \leq Ri < P4$ | $P4 \leq Ri < P5$ | $P5 \leq Ri < Le$ |
|---|---|---|---|---|---|---|
| $0 \leq Ki < P1$ | — | | | | | |
| $P1 \leq Ki < P2$ | M1 = Si | — | | | | |
| $P2 \leq Ki < P3$ | M1, M2 = Si/2 | M2 = Si | — | | | |
| $P3 \leq Ki < P4$ | M1 ~ M3 = Si/3 | M2 ~ M3 = Si/2 | M3 = Si | — | | |
| $P4 \leq Ki < P5$ | M1 ~ M4 = Si/4 | M2 ~ M4 = Si/3 | M3 ~ M4 = Si/2 | M4 = Si | — | |
| $P5 \leq Ki < Le$ | M1 ~ M5 = Si/5 | M2 ~ M5 = Si/4 | M3 ~ M5 = Si/3 | M4 ~ M5 = Si/2 | M5 = Si | — |

First, in step S210, it is determined whether the conveyance speed v (m/s) of the conveyor 30 is zero or not, and in the case where the conveyor 30 is stationary, the outputs M1_OUT to M5_OUT from the microwave generators 20 are set to zero thereby to end the program in step S215.

In the case where the conveyor 30 is in operation, on the other hand, the process proceeds to step S220. In step S220, the variables M1 to M5 indicating the quantity of the ceramic molded articles 8 per microwave generator 20 in each drying area 340 supplied with the microwave energy from the first to fifth microwave generators are cleared to zero. Also, the variable i that is the counter for the drying area 10 is reset to zero.

In step S230, the variable i counted up is compared to the constant SUM that is the maximum number of the first rests 341 allowed on the first rests 341 in the drying chamber 10. Until the variable i exceeds the constant SUM, a series of calculating operation is repeatedly executed from step S240 thereby to calculate the variables M1 to M5.

In the case where the variable i has exceeded the constant SUM, on the other hand, the process proceeds to step S235. In step S235, the output values of the first to fifth microwave generators are set to M1_OUT to M5_OUT, respectively, in accordance with the variables M1 to M5 indicating the quantity of the ceramic molded articles per microwave generator 20.

According to this embodiment, as in the first embodiment, the variables M1 to M5 are multiplied by the constant K to calculate the output values M1_OUT to M5_OUT of the microwave generators 20.

In step S240, the individual data in the area data on the i-th charged drying area 340 retrospectively from the current time Tnow (s) are accessed. First, in the individual information, the time Ti_s (s) when the head of the drying area 340 is charged into the drying chamber and the time Ti_e (s) when the tail end of the drying area 340 is charged into the drying chamber, are read out.

The difference between time Tnow and Ti_s is multiplied by the speed v (m/s) of the conveyor 30, thereby calculating the head position Ri (m) of the i-th drying area 340 in the drying chamber 10. Also, the difference between time Tnow and Ti_e is multiplied by the speed v (m/s) of the conveyor 30 thereby to calculate the tail end position Ki (m) of the i-th drying area 340 in the drying chamber 10.

The oblique lines in the matrix chart shown in the table indicate the "impossible" state in which the tail end position Ki is located ahead of the head position Ri of the drying area 340. The lateral lines in the matrix chart, on the other hand, indicates the state in which the i-th drying area 340 is located intermediate the adjacent microwave generators 20 and supplied with microwave energy from none of the microwave generators 20.

In step S260, in accordance with this matrix chart, the variables M1 to M5 indicating the quantities of the ceramic molded articles 8 per unit of the first to fifth microwave generators, respectively, are calculated. In the case where the i-th drying area 340 is associated with at least one state described in the matrix chart, the variables M1 to M5 are calculated in accordance with the calculation formula associated with the particular state. Also, in the case where the i-th drying area 340 is associated with none of the states in the matrix chart, on the other hand, none of the variables M1 to M5 is calculated.

Assume that it is determined in step S250 that the i-th drying area 340 is associated with the state defined by dotted line in the matrix chart. In this state, the head Ri of the drying area 340 is located between the first microwave generator and the second microwave generator and the tail end Ki is located between the third microwave generator and the fourth microwave generator.

In this state, the second microwave generator and the third microwave generator supply microwave energy to the i-th drying area 340 at the same time. Assume that the quantity Si of the ceramic molded articles 8 existing in the drying area 340 is four, for example. In step S260, the quantity M2 covered by the second microwave generator and the quantity M3 covered by the third microwave generator are calculated in the manner described below.

Specifically, the quantity of the ceramic molded articles 8 in the drying area 340, that is 4, is divided by the number of the microwave generators 20 associated with the particular drying area 340, that is 2. Thus, the calculation is made on the assumption that two ceramic molded articles are covered by each microwave generator.

In the control unit according to this embodiment, in parallel to the production of the area data, a series of operations before the microwave generators 20 come to be operated with a predetermined output value is carried out in the control cycle period of 0.2 seconds.

After specifying the relation between the microwave generators 20 and the drying areas 340 which undergo a constant change with the operation of the conveyor 30, the output of each microwave generator 20 is changed and set as desired.

As described above, with the drying apparatus 1 of the ceramic molded articles 8 according to this embodiment, the ceramic molded articles 8 in the drying chamber 10 are irradiated with microwave energy substantially uniformly. Even in the case where the ceramic molded articles 8 are arranged at irregular intervals in the drying chamber 10, microwave energy is radiated substantially uniformly on the ceramic molded articles 8 by adjusting the output values of the microwave generators 20 appropriately. As a result, there is less chance of occurrence of an overdried or undried ceramic molded article 8.

The other parts of the configuration and the operation and effects of this embodiment are similar to those of the first embodiment.

Unlike in this embodiment, the first rests 341 carrying the ceramic molded articles 8 may be charged into the drying chamber 10 at random instead of at predetermined intervals. The control specifications based on the flowchart (FIG. 12) and the matrix chart (table) can meet a wide variety of charge patterns of the ceramic molded articles 8.

(Third Embodiment)

This embodiment concerns a case in which at least a radio wave absorber is arranged on the inner wall of the drying chamber in place of the partitioning walls limiting the range of microwave energy radiation in the drying apparatus according to the first embodiment.

In the drying apparatus 1 according to this embodiment, as shown in FIG. 13, a plurality of radio wave absorbers 440 are attached on the inner wall of the drying chamber 10. The radio wave absorbers 440 limit the range of microwave radiation for each microwave generator 20.

Specifically, in the drying chamber 10 with the radio wave absorbers 440 attached on the inner wall thereof, the microwave supplied into the drying chamber 10 is less likely to reach a distant point by being repeatedly reflected. With this drying chamber 10, as shown in FIG. 12, the microwave energy constituting a direct wave generated from the microwave generators can dry the ceramic molded articles 8.

According to this embodiment, the height of each microwave generator 20 and the angle of microwave energy radiation are set in such a manner that the microwave energy radiation from the particular microwave generator 20 ranges from −La (m) to La (m) with the position of the microwave generator 20 as the center. This setting is substantially equivalent to the fixed arrangement of the drying blocks in the range of −La (m) to La (m) with each microwave generator 20 as the center according to the first embodiment.

In this embodiment, the microwave generators 20 are controlled in substantially the same way as in the first embodiment. Specifically, the microwave energy radiation output of each microwave generator 20 is controlled in accordance with the quantity of the ceramic molded articles 8 existing in the range of −La (m) to La (m) with each microwave generator 20 as the center.

As described above, with the drying apparatus 1 according to this embodiment, like the drying apparatus in the first embodiment, the ceramic molded articles 8 conveyed through the drying chamber 10 are irradiated with microwave energy substantially uniformly and therefore can be dried with high uniformity.

The other parts of the configuration and the operation and effects are similar to those of the first embodiment.

As described above, according to the first aspect of the present invention, a drying apparatus is preferably so configured that a plurality of drying blocks segmented along the direction of conveyance by the partitioning walls having openings to pass the ceramic molded articles on the conveyor are formed in the drying chamber, and one or a plurality of the microwave generators arranged in each drying block produce an output changing in accordance with the quantity of the ceramic molded articles existing in each drying block.

In this case, the interior of the drying chamber can be segmented into a plurality of zones by the drying blocks fixedly arranged.

In accordance with the quantity of the ceramic molded articles existing in each drying block, the output of each microwave generator arranged in each drying block is appropriately set. In this way, the microwave can be radiated substantially uniformly on all the ceramic molded articles.

In accordance with the quantity of the ceramic molded articles in the drying blocks which changes with the conveyance of the ceramic molded articles, the output of the microwave generators arranged in each drying block is appropriately changed. In this way, the microwave energy can continue to be radiated at a substantially constant rate on each ceramic molded article in conveyance.

Therefore, the train of the ceramic molded articles being conveyed, even if arranged at irregular intervals, are neither overdried nor left undried.

Further, each ceramic molded article is irradiated with microwave energy at a substantially constant rate while being conveyed through the drying chamber. The ceramic molded articles, therefore, can be dried at a substantially constant rate, and there is less chance of the ceramic molded articles being strained.

Furthermore, by arranging radio wave absorbers for absorbing microwave energy on the inner peripheral surface of the drying chamber as desired, the microwave energy leakage between adjacent drying blocks is reduced for improved effects of the first aspect of the present invention.

Various methods can be conceived for determining the drying blocks associated with a given ceramic molded article which transfers from a drying block to an adjacent one.

In one determining method, a given ceramic molded article is regarded to exist in a given drying block located ahead along the direction of conveyance at the time when the whole of the ceramic molded article comes to be covered by the particular drying block. As an alternative, a given ceramic molded article is regarded to exist in a given drying block located ahead along the direction of conveyance at the time when a part of the ceramic molded article comes to be covered by the particular drying block. As another alternative, a given ceramic molded article can be regarded to belong to adjacent drying blocks in the proportion of association with the respective adjacent drying blocks.

Also, the inner peripheral wall of the drying chamber is formed with the radio wave absorbers, and each microwave generator is preferably so configured to change the output thereof in accordance with the quantity of the ceramic molded articles existing in a predetermined range from the particular microwave generator.

In this case, the microwave energy radiation range of each microwave generator can be limited without installing any physical partitioning walls or the like in the internal space of the drying chamber.

Without adding new members such as partitioning walls or the like to the drying chamber or the conveyor, therefore, the simple arrangement of radio wave absorbers on the inner peripheral wall of the drying chamber can realize a drying apparatus according to the present invention.

The output of each microwave generator is set in accordance with the quantity of the ceramic molded articles existing in a predetermined range from each microwave generator. In this way, the ceramic molded articles can be dried with higher uniformity and, even in the case where the train of the ceramic molded articles conveyed in the drying chamber are arranged at irregular intervals, they are neither overdried nor remain undried.

The predetermined range set as described above from each microwave generator may be a range which can be reached by the microwave energy directly, as determined from the relation between the arrangement of the microwave energy radiation port and the radiation angle.

The higher the estimation accuracy of the predetermined range and the more approximate the predetermined range to the actual microwave radiation range of the microwave generator, the higher the uniformity with which the ceramic molded articles can be dried.

The ceramic molded articles are adapted to be placed on the rests and conveyed through the drying chamber.

A substantially tabular reflector for reflecting the microwave energy is mounted substantially at right angles to the direction of conveyance at one of the forward and rear end portions of at least a part of the rests.

The microwave generators are preferably configured to change the output thereof in accordance with the quantity of the ceramic molded articles existing in the drying area formed between adjacent reflectors in the drying chamber.

In this case, the interior of the drying chamber can be segmented into one or a plurality of drying areas by the adjacent reflectors. These drying areas, unlike the drying blocks for fixedly segmenting the interior of the drying chamber according to the second embodiment, move in the drying bath with the conveying operation of the conveyor.

In accordance with the quantity of the ceramic molded articles existing in a given drying area, the output of the microwave generators radiating the microwave energy on the particular drying area is set. In this way, the ceramic molded articles conveyed in the drying chamber are dried substantially uniformly.

Also, in accordance with the movement of the drying areas in the drying chamber, the output of the microwave generators are changed and set. In this way, the microwave is radiated on the ceramic molded articles at a substantially constant rate.

Further, an arrangement of at least a radio wave absorber for absorbing the microwave energy on the inner peripheral surface of the drying chamber can reduce the microwave energy leakage between adjacent drying blocks and thereby further improve the effects of the invention according to the first aspect described above.

Various methods can be conceived for determining which of the drying areas is supplied with microwave energy by a given microwave generator at the time of switching the drying areas relative to the microwave generator with the operation of the conveyor.

In one determining method, when a reflector located ahead in the direction of conveyance reaches the radiation range of a microwave generator, it is determined that the microwave is supplied to the drying area rearward of the particular reflector. As an alternative, when a reflector located ahead in the direction of conveyance has passed the radiation range of a given microwave generator, it is determined that the drying area rearward of the particular reflector are supplied with microwave energy. As another alternative, while a given reflector ahead in the direction of conveyance is passing through the radiation range of a given microwave generator, it is determined that the drying areas located before and after the particular reflector are both supplied with microwave energy in the proportion of the radiation range divided by the reflector.

The radiation port for radiating the microwave energy into the drying chamber from the microwave generators is preferably open to each of the ceiling and bottom of the drying chamber.

In this case, each ceramic molded article is irradiated with microwave energy from both above and below, so that both the upper and lower portions of the ceramic molded article can be dried uniformly substantially without radiation irregularities.

Also, the radiation port is preferably open to each of the two end portions of the ceiling and the bottom substantially at right angles to the direction of conveyance.

In this case, each ceramic molded article is irradiated from both above and below at two points of each of the ceiling and the bottom across the direction of conveyance, and thus the whole of each ceramic molded article is dried uniformly.

Also, the radiation port for radiating microwave energy into the drying bath from the microwave generators is preferably open to each lateral side across the direction of conveyance in the drying chamber.

In this case, each ceramic molded article is irradiated with microwave from the two lateral sides across the direction of conveyance, and thus the two lateral side portions of each ceramic molded article can be uniformly dried.

Further, the radiation port is preferably open to each of the upper and lower end portions of the two lateral sides.

In this case, each ceramic molded article is irradiated with microwave energy from both above and below on the two lateral side portions across the direction of conveyance, and thus the whole of the ceramic molded article is dried substantially uniformly.

Also, the ceramic molded article preferably has a honeycombed structure with a multiplicity of cells formed by cell walls arranged in the form of honeycomb.

In this case, the ceramic molded articles are liable to be strained when being dried, and therefore the operating features according to the first aspect of the present invention described above are especially effective.

According to a second aspect of the present invention, the drying chamber has a plurality of drying blocks segmented in the direction of conveyance by the partitioning walls each having an opening for passing the ceramic molded articles conveyed in the drying chamber. Each of the drying blocks has arranged therein one or a plurality of microwave generators, and the output of the microwave generators is preferably changed in accordance with the quantity of the ceramic molded articles existing in each drying block.

In this case, in accordance with the quantity of the ceramic molded articles existing in each drying block fixed arranged in the drying chamber, the output of each microwave generator arranged in each drying block is appropriately set. In this way, the microwave energy can be radiated substantially uniformly over all the ceramic molded articles.

Thus, while maintaining the high accuracy of the ceramic molded articles extruded, the ceramic molded articles can be dried and completed with high quality.

Also, the inner peripheral wall of the drying chamber is formed with at least a radio wave absorber, and the output of each microwave generator is preferably changed in accordance with the quantity of the ceramic molded articles existing in a predetermined range from the particular microwave generator.

In this case, the microwave energy radiation range of the microwave generators can be limited without any physical partitioning walls or the like in the internal space of the drying chamber.

In accordance with the quantity of the ceramic molded articles existing within a predetermined range from each microwave generator, the output of the particular microwave generator is set, thereby making it possible to dry the ceramic molded articles with higher uniformity. Even in the case where the train of ceramic molded articles in the drying chamber are arranged at irregular intervals, the ceramic molded articles are less liable to be overdried or left undried.

The predetermined range from a microwave generator is defined as a range reached by the microwave energy constituting a direct wave determined from the relation between the arrangement of the microwave energy radiation port and the radiation angle.

The higher the accuracy with which the predetermined range is estimated and the nearer the actual microwave energy radiation range of the microwave generator, the higher the uniformity with which each ceramic molded article is dried.

The ceramic molded articles placed on the rests are charged into the drying chamber and dried in such a configuration that a substantially tabular reflector for reflecting the microwave energy is mounted substantially at right angles to the direction of conveyance at one of the forward and rearward ends of at least a part of the rests along the direction of conveyance, and that the output of each microwave generator is preferably changed in accordance with the quantity of the ceramic molded articles existing in a drying area formed between adjacent ones of the reflectors and the number of the microwave generators for supplying the microwave energy to the particular drying area in the drying chamber.

In this case, in accordance with the quantity of the ceramic molded articles existing in a drying area formed between adjacent reflectors in the drying chamber, the output of the microwave generator for radiating the microwave energy on the drying area is set, thereby making it possible to dry the ceramic molded articles substantially uniformly in the drying chamber.

Also, according as the drying area moves in the drying chamber, the output of each microwave generator is changed and set. In this way, the microwave energy can continue to be radiated at a substantially constant rate on the ceramic molded articles.

Various methods are conceivable to determine which drying area is supplied with microwave energy by a given microwave generator while a reflector is located at the position of the particular microwave generator and a drying area supplied with microwave energy by the same microwave generator moves.

In one determining method, when a reflector located ahead in the direction of conveyance arrives at a microwave generator, it is determined that microwave energy is supplied to a drying area located rearward of the reflector. In another method, when a reflector located forward in the direction of conveyance has passed the position of a microwave generator, it is determined that microwave energy is supplied to a drying area located rearward of the particular reflector. In still another method, while a reflector located forward in the direction of conveyance is passing through the position of the particular microwave generator, it is determined that microwave energy be supplied to the drying areas located both forward and rearward of the reflector.

The ceramic molded articles are charged into the drying chamber in such a manner that the interval between adjacent reflectors is preferably in the range of 30% to 200% of the interval between the microwave generators arranged equidistantly along the direction of conveyance in the drying chamber.

In this case, each drying area is properly irradiated with microwave energy and each ceramic molded article in each drying area can be dried with high uniformity.

In the case where the interval between adjacent reflectors in the drying chamber exceeds 200% of the interval between the microwave generators and the length of the drying area along the direction of conveyance is increased, on the other hand, an arrangement of the ceramic molded articles at irregular intervals in the drying area may cause the microwave energy to be radiated unevenly on the ceramic molded articles in the particular drying area.

In the case where the interval between adjacent reflectors is less than 30% of the interval between microwave generators, on the other hand, the drying area is located between the adjacent microwave generators and may be supplied with microwave energy from none of the microwave generators for a longer time.

While the invention has been described by reference to specific embodiments chosen for purposes of illustration, it should be apparent that numerous modifications could be made thereto by those skilled in the art without departing from the basic concept and scope of the invention.

The invention claimed is:

1. An apparatus for drying ceramic molded articles, comprising a drying chamber for accommodating the ceramic molded articles, a plurality of microwave generators for supplying microwave energy in the frequency range of 300 MHz to 300 GHz into said drying chamber, a conveyor for charging said ceramic molded articles continuously into said drying chamber, conveying said ceramic molded articles through said drying chamber and delivering said ceramic molded articles from said drying chamber, and a plurality of rests each adapted to receive a ceramic molded article and be conveyed by the conveyor through said drying chamber, wherein said drying chamber has arranged therein said plurality of microwave generators in the direction of conveyance of said conveyor and at least a sensor for detecting the distribution of said ceramic molded products in said drying chamber, and further comprising:

a control device for changing the output of each of said microwave generators in accordance with the distribution of said ceramic molded articles in said drying chambers, wherein a substantially tabular reflector for reflecting the microwave eneray is mounted, substantially at a right angle to the direction of conveyance, at one of the forward and rearward end portions of at least some of said rests, the other rests having no tabular reflector mounted thereto, and wherein each of said microwave generators is adapted to change the output thereof in accordance with the quantity of said ceramic molded articles existing in respective drying areas formed between adjacent ones of said reflectors in said drying chamber.

2. An apparatus for drying ceramic molded articles according to claim 1, wherein a radiation port for radiating the microwave energy from each of said microwave generators into said drying chamber is opened to each of the ceiling and the bottom in said drying chamber.

3. An apparatus for drying ceramic molded articles according to claim 2,
wherein said radiation port is open to each of the two end portions of each of said ceiling and said bottom extending in the direction substantially at right angles to the direction of conveyance.

4. An apparatus for drying ceramic molded articles according to claim 1,
wherein a radiation port for radiating the microwave energy into said drying chamber from said microwave generators is opened to each of the two lateral side surfaces extending in parallel to the direction of conveyance in said drying chamber.

5. An apparatus for drying ceramic molded articles according to claim 4,
wherein said radiation port is opened to each of the upper and lower end portions of said two lateral side surfaces.

6. An apparatus for drying ceramic molded articles according to claim 1,
wherein each of said ceramic molded articles has a honeycombed structure formed with a multiplicity of cells by a plurality of cell walls arranged in honeycomb form.

* * * * *